UNITED STATES PATENT OFFICE.

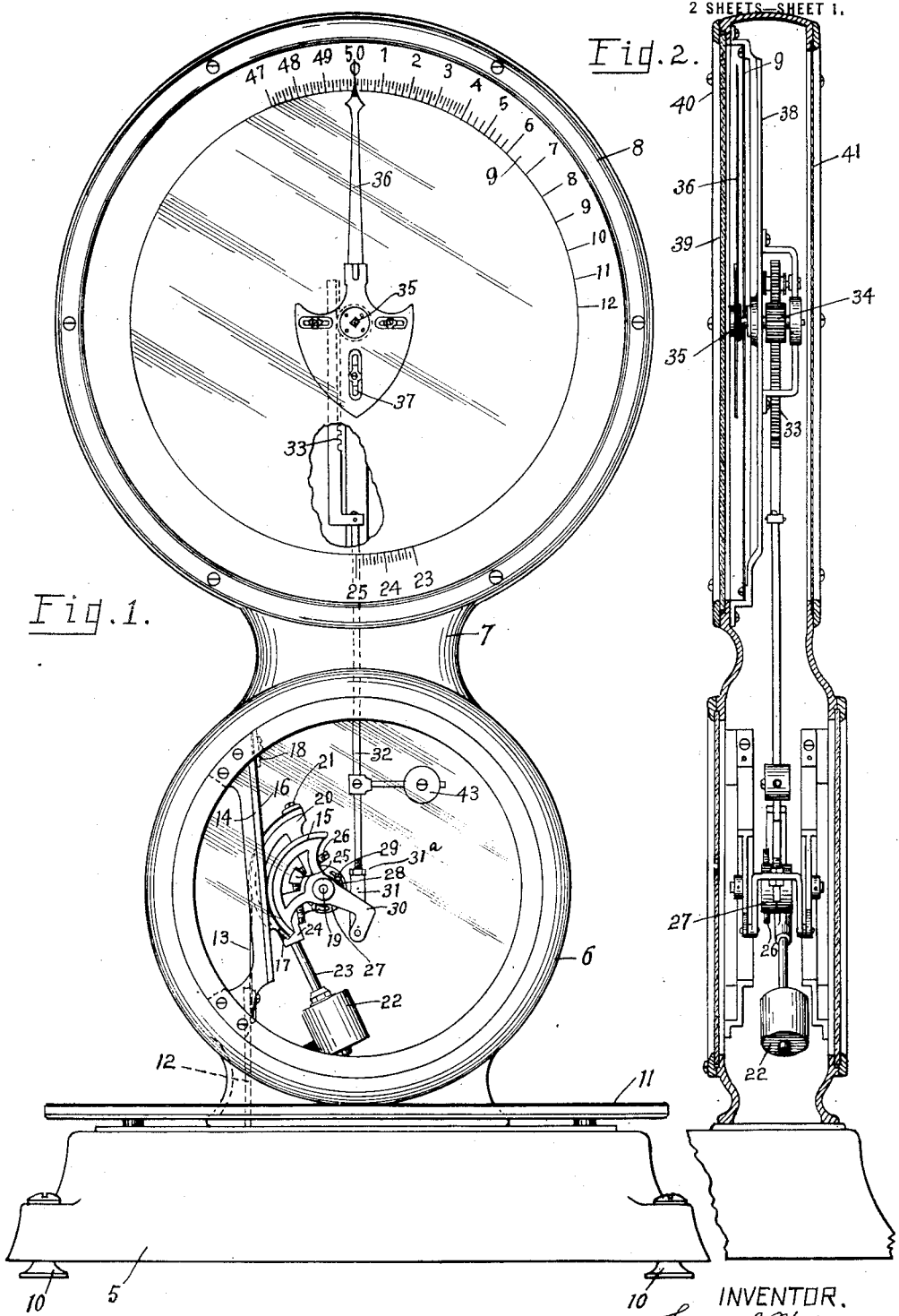

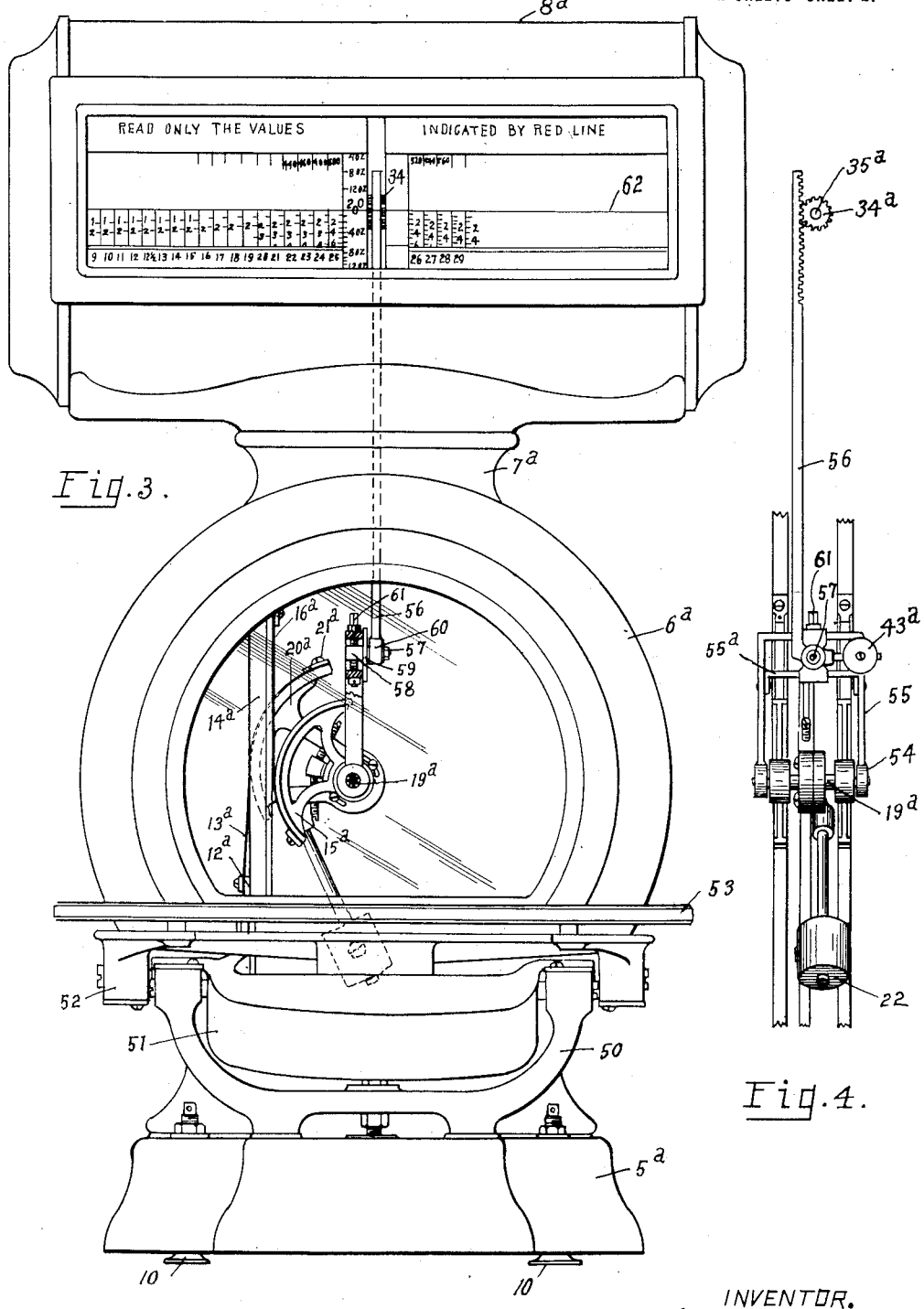

LEWIS C. WETZEL, OF TOLEDO, OHIO, ASSIGNOR TO TOLEDO SCALE COMPANY, OF TOLEDO, OHIO, A CORPORATION OF NEW JERSEY.

AUTOMATIC WEIGHING-SCALE.

1,351,080. Specification of Letters Patent. Patented Aug. 31, 1920.

Application filed July 5, 1916. Serial No. 107,719.

*To all whom it may concern:*

Be it known that I, LEWIS C. WETZEL, a citizen of the United States, residing at Toledo, in the county of Lucas and State of Ohio, have invented certain new and useful Improvements in Automatic Weighing-Scales, of which the following is a specification.

My invention relates to improvements in automatic weighing scales of the pendulum type, and particularly to counter scales—*i. e.*, scales of relatively small capacity adapted to rest on counters in stores, shops, and like places.

Among the principal objects of this invention are the provision of improved pendulum weighing mechanism in scales of this type, the adaptation in counter scales of a vertically-movable pendulum having rolling contact on the framework of the scale, and the provision of means for driving the indicating mechanism directly from the vertically-movable pendulum, whereby a construction is provided in which a relatively great movement is imparted to the indicating mechanism directly from the pendulum mechanism, enabling the use of a comparatively large pinion on the indicator shaft.

A further object of the invention is to provide a scale mechanism that is simple, inexpensive and efficient, is composed of parts not liable to become deranged, and furthermore, wherein none of said parts are subjected to excessive strain.

Other objects and advantages will readily appear from the following description of the invention, in which reference is had to the accompanying drawings illustrating preferred embodiments of the invention, and wherein similar reference numerals designate similar parts throughout the several views.

In the drawings:—

Figure 1 is a front elevation, with parts broken away, of one form of scale embodying my improvements therein; Fig. 2 is a central longitudinal section therethrough; Fig. 3 is a front elevation, with parts broken away, of another embodiment of my invention; and Fig. 4 is a detail view of the pendulum weighing mechanism and connection therefrom to the indicating mechanism.

In the drawings, I have shown two well-known types of counter scales by way of example, that shown in Fig. 1 embodying a base adapted to rest upon a counter above which is mounted a dial having weight graduations inscribed thereon, with which graduations a rotatable pointer coöperates to indicate the weight of commodities placed upon the scale platform. The scale platform is supported upon suitable platform lever mechanism contained in the base and connections are made from the platform lever mechanism to the pendulum weighing mechanism, from which is actuated mechanism for rotating the indicator hand. In Fig. 3 is shown the cylinder type of counter scale in which a cylinder or drum is provided with a peripheral chart on which is inscribed the several weight and price computations, the cylinder itself being rotatable with reference to a fixed reading wire through suitable driving mechanism actuated from the pendulum weighing mechanism, which in turn is connected with and actuated from the lever mechanism supporting the scale platform. These two types are shown to illustrate the adaptability of my invention to the usual types of counter scales, and it is to be understood that my invention is not intended to be limited to any particular type of scale but is useful in various scales of greatly differing types.

In the embodiment shown in Fig. 1, the numeral 5 represents the base of the scale upon which is supported a housing 6 adapted to inclose the pendulum weighing mechanism of the scale and which is connected, as by the saddle-piece 7, with the casing 8 adapted to inclose the graduated dial 9 and the remainder of the indicating mechanism. The base 5 is adapted to be supported upon adjustable feet 10 which are preferably provided at each corner, these feet being separately adjustable to provide means whereby the scale may be leveled. The platform 11 is supported upon suitable platform lever mechanism (not shown) preferably inclosed within the base 5, and connection is made from the nose iron of the platform lever mechanism to the pendulum weighing mechanism, as by means of the link 12 and flexible strap 13. It is to be understood that any suitable platform or platform lever mechanism may be employed in connection with the weighing mechanism of the scale, the weighing mechanism herein shown being designed to operate when employed in various kinds of scales.

The pendulum mechanism preferably rests upon a pair of substantially vertical or slightly inclined tracks 14 suitably secured within the housing 6, and form bearings or tracks for a pair of rocker segments 15 which have rolling contact thereon, being supported in position by flexible ribbons 16 of steel or other suitable material fastened to the lower ends of the segments, as at 17, and at their upper ends to the tracks, as at 18, being thus interposed between the tracks and segments at every position of the latter. The segments 15 are mounted upon the same shaft 19, which also supports a larger segment 20 arranged between the pair of supporting segments 15, the periphery of the larger segment extending between the tracks 14 and being connected, as at 21, with the upper end of the flexible ribbon 13, the lower end of which is secured to the link 12 connected to the platform lever mechanism, the ribbon 13 passing over the arcuate face of the segment 20, as clearly shown in Fig. 1. The pendulum weight 22 is adjustably mounted upon the stem 23 which is fixed in a casting 24 loosely mounted upon the shaft 19 and for purposes of adjustment around said shaft a projection 25 on said casting is secured between oppositely-disposed set screws 26 mounted in a ring 27 fixed upon the shaft 19. The casting 24 and weight 22 are rotatably adjusted to the desired position while the set screws 26 are loosened, and are then clamped in the adjusted position by said screws. The ring 27 is provided with curved slots 28, as shown in Fig. 1, to allow the rotation of the casting 24 relatively thereto, locking screws 29 threaded in said casting passing through the slots, as shown. Radial arms 30 extend from each of the supporting segments 15 and pivotally support the link 31 carrying the rack-rod 32, the rack 33 of which meshes with the pinion 34 on the indicator shaft 35. The rack-rod 32 is adjustably connected with the link 31 in any desired manner, as, for example, by threading the rack-rod into said link, suitable locking nuts, as 31ª, being provided for maintaining the desired adjustment.

The indicator shaft 35 is mounted concentrically of the dial 9. Fixedly secured upon the forward extremity of said shaft is the indicator hand 36 preferably formed of sheet metal and adjacent its pivotal point expanded into a plate which is appropriately slotted, as at 37, to receive small adjustable weights for accurately counterbalancing the hand. The dial 9 is preferably secured upon a framework 38 within the housing 8 and is covered by a suitable transparent plate 39 fixed on the front of the housing, as by means of the scroll 40. If desired, a similar dial may be arranged at the rear of the housing 8, or the rear may be closed by a plate 41, as shown in Fig. 2. A suitable weight 43 may be arranged upon the rack-rod 32 to maintain the rack 33 in mesh with the pinion 34.

In the operation of the scale shown in Figs. 1 and 2, a commodity placed on the platform 11 will depress the link 12 through the platform lever mechanism (not shown) and pull downwardly upon the ribbon 13 secured to the larger segment 20, thereby rocking said segment to swing the pendulum weight 22 upwardly a sufficient distance to offset the weight of the commodity upon the scale platform. The supporting segments 15 will be simultaneously rocked and will advance upwardly along the tracks 14, thereby elevating the rack-rod 32 through its connection with the radial arms 30 attached to the segments 15. The movement of the rack-rod will be transmitted to the pinion 34 to rotate the indicator hand 36 through a proportionate arc to indicate on the graduated dial 9 the weight of the commodity.

It will be noted that the connection from the pendulum mechanism to the rack-rod is eccentric in the embodiment shown in Fig. 1, the radial arms 30 extending outwardly from the axis of the pendulum, and when during the weighing operation the pendulum is swung upwardly, the axis of the pendulum (which can be considered as located at the center point of the shaft 19) is vertically raised a proportionate distance while the point of connection of the radial arms 30 with the rack-rod moves through an arc of increased length, thus increasing the extent of travel of the rack-rod so as to allow the use of a larger pinion 34 on the indicator shaft 35. However, the movement from the vertical due to the arc of travel may be obviated by making the connection with the rack-rod concentrically of the supporting segments and in line with the axis, such construction being shown in Fig. 3. Also the tracks or bearings 14 may be inclined substantially as shown in Fig. 1, to partly or wholly compensate for the outward swing of the point of connection with the rack-rod on the radial arms 30 during the rocking of the segment. It is to be understood, however, that the inclined position of the tracks 14 is not essential, and in Fig. 3 is shown a construction in which the tracks are arranged in a true vertical line.

Referring now to the construction shown in Figs. 3 and 4, the base 5ª supports at its rear extremity the housing 6ª, which in turn supports the cylindrical casing 8ª through the saddle-piece 7ª. Upon the pair of base horns 50 rests the fulcrum pivots of the main lever 51 which supports the platform spider 52 carrying the platform 53. The inner end of the lever is pivotally connected with the link 12ª engaging the lower extremity of the flexible ribbon 13ª which passes over the arcuate face of the larger segment 20ª of the pendulum mechanism and is secured at its upper end thereto, as at 21ª. The pendulum mechanism is substantially identical with that shown in the modification illustrated in Fig. 1 with the exception that the tracks 14ª against which bear the supporting segments 15ª and the flexible supporting ribbons 16ª are arranged so that the contact surfaces thereof are in parallel vertical planes. The connection from the pendulum mechanism to the indicating mechanism is arranged on the axis of the supporting segments 15ª, the shaft 19ª on which the segments are secured being extended on each side, as shown in Fig. 4, to receive the journals 54 of the U-shaped link 55, upon which the lower end of the rack-rod 56 is pivotally mounted. The journals 54 are preferably provided with ball or roller bearings, so that the engagement with the shaft 19ª will be substantially frictionless. As herein shown, the rack-rod is adjustably mounted upon the link 55, a journal 57 on said rod surrounding the stub shaft 58 secured in and extending on opposite sides of the plate 59, the rack-rod being held against lateral movement on the shaft by the lock nut 60. The plate 59 is preferably arranged for vertical adjustment as shown in Fig. 3, one side of the plate bearing against the sides of the upper bar of the link 55 and a crossbar 55ª spaced therefrom, the shaft 28 extending between said bars and being engaged on opposite sides by the pair of set screws 61. When the set screws are loosened the plate may be slid vertically to any desired position and the set screws are then tightened, securing the plate and rack-rod in the adjusted position. A weight 43ª is arranged on the rack-rod to maintain the teeth of the rack in engagement with the pinion 34ª secured upon an elongated indicator shaft 35ª suitably journaled in the casing 8ª, and carrying a drum or cylinder bearing on its periphery a chart having graduated weight and price computation numerals coöperating with a fixed indicator line 62 to indicate the weights and values of commodities placed upon the scale platform in the usual manner of computing scales of the cylinder type.

In operation, the pendulum mechanism is rocked upwardly by the pull exerted on the main lever 51 through the weight of a commodity placed on the platform 53, and in moving upwardly raises the rack-rod 56 to rotate the pinion 34ª and the indicator drum through a proportionate arc to indicate the weight of the commodity on the platform. Since the connection to the indicating mechanism is on the axis of the pendulum mechanism, the extent of movement of the rack-rod 56 will not be as great as in the modification shown in Fig. 1 wherein the radial arms 30 are utilized to increase the movement of the rack-rod, but because of the vertical location of the tracks 14ª, the shaft 19ª will move upwardly in a true vertical line so that the rack-rod 56 will not be moved through an arc as in the first described modification.

While it will be apparent that the illustrated embodiments of my invention herein disclosed are well calculated to adequately fulfil the objects primarily stated, it is to be understood that the construction is susceptible to modification, variation and change without departing from the spirit and scope of the invention as set forth in the subjoined claims.

Having described my invention, I claim:

1. In a scale, a platform, a casing, indicating mechanism including a pinion rotatably mounted within the casing, guide tracks carried by the casing, a pendulum suspended within the casing and adapted to contact with said tracks, a connection between the pendulum and platform, a rack rod carrying a rack meshing with said pinion, and means for pivotally connecting said rack rod to said pendulum and for adjusting the effective length of said rack rod.

2. In a scale, a casing, indicating mechanism including a pinion mounted in the casing, a pendulum suspended within the casing and including a plurality of segments, tracks for guiding the pendulum in its load-offsetting movements, a U-shaped link pivotally connected with said segments, and a rack-rod mounted in said link and carrying a rack meshing with the pinion.

3. In a scale, a platform, a casing, indicating mechanism including a pinion mounted in the casing, guide tracks carried by the casing, a pendulum suspended in the casing and including supporting segments adapted to contact with said tracks, a connection from the platform to the pendulum, radial arms projecting from the segments, and a rack-rod connected with the radial arms and carrying a rack meshing with the pinion.

4. In a scale, a platform, a casing, indicating mechanism including a pinion mounted in the casing, guide tracks carried by the casing, a pendulum suspended in the casing and including supporting segments adapted to contact with said tracks, a connection from the platform to the pendulum, radial arms projecting from the segments, and a rack-rod pivotally connected with the radial arms, said rack-rod being adjustable in length and carrying a rack meshing with the pinion.

5. In a scale, a platform, a casing, indicating mechanism including a pinion mounted in the casing, inclined guide tracks carried by the casing, a pendulum suspended in the casing and including supporting segments adapted to contact with said tracks, a connection from the platform to the pendulum, radial arms projecting from the segments, and a rack-rod connected with the radial arms and carrying a rack meshing with the pinion.

LEWIS C. WETZEL.